United States Patent
Sågfors et al.

(10) Patent No.: US 8,279,806 B2
(45) Date of Patent: Oct. 2, 2012

(54) TECHNIQUE FOR UPLINK DATA TRANSMISSIONS IN COMMUNICATION NETWORKS

(75) Inventors: Mats Fredrik Sågfors, Kyrkslätt (FI); Janne Peisa, Espoo (FI); Per Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 12/601,842

(22) PCT Filed: May 29, 2007

(86) PCT No.: PCT/EP2007/004733
§ 371 (c)(1), (2), (4) Date: Jan. 26, 2010

(87) PCT Pub. No.: WO2008/145153
PCT Pub. Date: Dec. 4, 2008

(65) Prior Publication Data
US 2010/0172295 A1   Jul. 8, 2010

(51) Int. Cl.
*H04W 4/00* (2009.01)
(52) U.S. Cl. ..................................... 370/328
(58) Field of Classification Search .............. None
See application file for complete search history.

(56) References Cited

U.S. PATENT DOCUMENTS

| | | | |
|---|---|---|---|
| 7,903,595 B2 * | 3/2011 | Choi et al. ............ | 370/311 |
| 7,965,679 B2 * | 6/2011 | Ranta-aho et al. ........ | 370/329 |
| 2003/0039217 A1 * | 2/2003 | Seo et al. ............ | 370/318 |
| 2004/0077370 A1 * | 4/2004 | Dick et al. ............ | 455/522 |
| 2005/0226182 A1 * | 10/2005 | Itoh .................. | 370/329 |
| 2006/0034226 A1 * | 2/2006 | Gu et al. ............. | 370/332 |
| 2006/0240859 A1 | 10/2006 | Gervais et al. | |
| 2008/0081655 A1 * | 4/2008 | Shin et al. ............ | 455/522 |

FOREIGN PATENT DOCUMENTS

| | | |
|---|---|---|
| EP | 1605605 A2 | 12/2005 |
| WO | 2006/054721 A1 | 5/2006 |

* cited by examiner

*Primary Examiner* — Anh-Vu Ly
(74) *Attorney, Agent, or Firm* — Coats & Bennett, P.L.L.C.

(57) ABSTRACT

The invention relates to a technique for uplink data transmissions in, e.g., mobile networks. A method embodiment for performing the technique in a transmitter (122) comprises the steps of allocating, for a first transmission (T1') as the transmission power for an uplink control channel (UCOCH), the smaller of an available transmission power and a desired transmission power for the uplink control channel; and allocating, for at least one subsequent transmission (T2') triggered by a feedback indication (128), zero transmission power to the uplink control channel (UCOCH).

21 Claims, 7 Drawing Sheets

Fig. 1B

| T1 | |
|---|---|
| CH | TP |
| UDACH | PO_D |
| UCOCH | PO_C |

| T2 | |
|---|---|
| CH | TP |
| UDACH | PO_D |
| UCOCH | PO_C |

Fig. 2A

| T1' | |
|---|---|
| CH | TP |
| UDACH | O |
| UCOCH | AP |

| T2' | |
|---|---|
| CH | TP |
| UDACH | AP |
| UCOCH | O |

Fig. 2B

| T1" | |
|---|---|
| CH | TP |
| UDACH | AP-PO_C |
| UCOCH | PO_C |

| T2" | |
|---|---|
| CH | TP |
| UDACH | AP |
| UCOCH | O |

- Receive, with a first transmission, only control information in the uplink control channel — 602
- Initiate, in response to the reception of the control information, a transmission of an acknowledgement for the reception of the control information to prompt at least one subsequent transmission of packet data associated with the control information — 604
- Receive, as an at least one subsequent transmission, only packet data in the uplink data channel — 606
- Initiate, in response to the reception of the packet data, a transmission of an acknowledgement for the successful reception of the packet data — 608
- Idle — 610

Fig. 6

TECHNIQUE FOR UPLINK DATA TRANSMISSIONS IN COMMUNICATION NETWORKS

TECHNICAL FIELD

The invention relates to techniques for data transmissions in error-prone communication environments such as in wireless networks. More specifically, the invention relates to a technique for uplink data transmissions in, e.g., mobile networks.

TECHNICAL BACKGROUND

Error control enables a data receiver to perform error detection and possibly also error correction in case of transmission errors. Techniques for error control are thus of general importance in any environment in which data are transmitted. Some environments are more prone to errors than others; for example, wireline communications will generally produce less errors per given amount of data than wireless communications. Error control schemes are available which have proven particularly useful in the one or the other environment.

For example, a class of data transmission schemes for error-prone transmission environments is represented by the Automatic Repeat Request (ARQ) "retransmission" schemes, which are utilized particularly in the field of mobile networks. In ARQ, after each transmission of a data block the transmitter waits for a feedback from the receiver before sending the next data block. The receiver will automatically request a repeated transmission of the data block in case of data corruption. In mobile networks conforming to the UMTS Release 5 or Release 6 standard, Hybrid ARQ (HARQ) transmission schemes are employed, in which the data transmission in a data channel is complemented by a transmission of (error) control information in a parallel control channel. This has been standardized in the UMTS Release 5 for HSDPA (High Speed Downlink Packet Access) transmission schemes and in UMTS Release 6 for E-DCH (Enhanced Uplink Dedicated Channel) transmission schemes.

The uplink control channel for E-DCH HARQ is called E-DPCCH (Enhanced uplink Dedicated Physical Control Channel) and carries control information such as an indication of the transport format selected for the packet data transmitted on the parallel uplink data channel (called E-DPDCH, Enhanced uplink Dedicated Physical Data Channel), an indication of the number of HARQ re-transmissions and a so-called happy bit which indicates if the transmitter, e.g. a mobile terminal called User Equipment (UE) in the UMTS environment, could use additional resources if scheduled. The control information increases the probability for successful reception of the data packets transmitted on the E-DPDCH.

Besides error handling, the usage of transmission resources is a general problem in wireless environments and in particular for uplink transmissions, i.e. transmissions in the direction from a terminal to a base station of the network. Terminals such as mobile phones, notebooks, handhelds, etc. generally have limited power resources, for example because of their limited power saving capabilities or because their maximum transmission power is limited due to regulations. Because of these restrictions, the available transmission power for a terminal is limited to a few Watts only in GSM or UMTS networks, whereas a base station may transmit with a power of tens of Watts. Therefore, successful reception of a data transmission at the base station cannot in general simply be afforded by increasing the transmission power. Instead, the terminal is required to efficiently use its available transmission resources while at the same time ensuring a reliable transmission, i.e. a successful reception of the transmitted data. A problem with existing HARQ schemes is that they require in some situations particularly many transmission resources for ensuring a reliable transmission, as will be discussed now.

For a HARQ transmission, each of the transmitted channels requires a particular amount of transmission power to ensure successful reception of each channel at the receiver. This channel-specific transmission power is determined according to predefined rules in the base station and/or the terminal and thus represents a "desired" transmission power. For example, in E-DCH, the desired transmission powers for the E-DPCCH and E-DPDCH, respectively, are determined relative to an uplink pilot channel (the so-called DPCCH, to be distinguished from the E-DPCCH), which is power-controlled by the Node B (the base station of the UMTS network). Whereas the power offset for the E-DPCCH relative to this pilot channel is constant, the actual power offset for the E-DPDCH depends on the chosen transport format (and some further parameters). In other words, the relative cost of the E-DPCCH increases as the offset used for the E-DPDCH decreases.

In more detail, the relative cost of the control channel is highest in cases where only few data have to be transmitted on the data channel, because the control channel carries a fixed amount of control information. As an example, in a E-DCH scheme the transport format with the largest and smallest data block sizes may be of order 10 kbits and some 10 bits, respectively (see, e.g., 3GPP TS 25.321, Annex B). The control information carried on the E-DPCCH may comprise 10 bits in each case. Thus the control information requires comparable resources as the data itself if one of the smallest transport formats is utilized. Small sized transport formats for the uplink data channel may generally be used in case of non-optimal transmissions conditions, e.g. if the terminal is located at a cell border.

In case the available transmission power in the transmitter is smaller than the desired transmission power for the data channel plus the desired transmission power for the control channel (plus possibly a desired transmission power for further channels), the transmitter is in a power-limited regime. In this regime it is particularly important to efficiently use the available transmission power and thereby ensure a reliable data transmission. Further predefined rules are applied in the power-limited regime to allocate the available transmission power to the channels. In E-DCH, the gain factor for the E-DPDCH may for example be reduced such that the relative overhead of the control channel is further increased.

The transmitter runs into a power-limited regime in particular for difficult transmission conditions when the desired transmission powers are high. And it is just in these cases that the relative fraction of the available transmission power allocated to the control channel is largest or, in other words, the relative fraction of the available transmission power allocated to the uplink data channel is lowest, which correspondingly decreases the probability of successful reception of the data. This in turn increases the probability that additional HARQ re-transmissions are required. Therefore the reduced transmission power for the uplink data channel is compensated using additional transmission time.

There exists therefore a need for a technique for uplink data transmission schemes which efficiently use available transmission resources for a reliable transmission.

SUMMARY OF THE INVENTION

According to a first aspect of the invention, a method for an uplink transmission of packet data from a transmitter to a receiver is proposed. An uplink data channel is provided for the uplink transmission of the packet data. An uplink control channel is provided to enable the uplink transmission of control information related to the transmission on the uplink data channel. The sum of the transmission powers for the uplink transmissions on both uplink channels is limited by an available transmission power. The method comprises the steps of determining, for the uplink control channel, a desired transmission power; allocating, for a first transmission as the transmission power for the uplink control channel, the smaller of the available transmission power and the desired transmission power for the uplink control channel; initiating the first transmission with the allocated transmission power; receiving a feedback indication related to related to a reception of the first transmission; and allocating, for at least one subsequent transmission triggered by the feedback indication, zero transmission power to the uplink control channel.

The method may be applied in a wireless network such as a mobile network. The receiver may be a terminal which transmits data to a base station of the mobile network. As one concrete example, the method may be applied to an uplink transmission of packet data from a User Equipment to a Node B of an UMTS network. The method may be implemented within an E-DCH framework, for example as one method (from a set of methods) which is conditionally applied e.g. in a power-limited regime of the UE.

The available transmission power may be a total transmission power available to the transmitter or may be that fraction of the total available transmission power which is available for the transmission on the parallel uplink control channel and uplink data channel (in case more information has to be transmitted on still other channels). The method may be selectively applied when the available transmission power is smaller than a sum of desired transmission powers for the uplink data channel and the uplink control channel, i.e., if the transmitter is in a power-limited regime. This does not exclude that the method may be applied also in other circumstances. For example, additionally or alternatively, the method according to the first aspect of the invention may be selectively applied when an amount of packet data to be transmitted is smaller than a predefined threshold.

As a further example, the method may additionally or alternatively be selectively applied for a predefined set of transport formats for the uplink transmission of the packet data; for instance, the method may be applied for a subset of a set of given transport formats, the subset possibly comprising one or more of the smallest transport formats of the set. The method according to the first aspect of the invention may also be the only error control method applied in the transmitter.

The desired transmission power for the uplink control channel may be that transmission power which appears to be required for a reliable reception of the control information at the receiver. Besides determining a desired transmission power for the uplink control channel, a desired transmission power may also be determined for the uplink data channel. Determining may, e.g., mean to calculate the desired transmission power based on predefined parameters and/or measurements or may mean to receive indications for the desired transmission powers from an internal or external resource such as a base station hosting the receiver or from another external component. For example, in an E-DCH system, a control node in the radio network (the radio network controller, RNC) configures offsets of the E-DPCCH and E-DPDCH channels using a signalling protocol, the Radio Resource Control (RRC) protocol.

The method may be selectively applied for a re-transmission of the packet data. In this case, upon detection that a scheduled submission is a re-transmission, i.e. the packet data have already been transmitted a predefined number of times in earlier transmissions, the steps of the method may be performed. In these earlier transmissions, at least one of the transmission scheme according to the first method aspect of the invention and another transmission scheme may have been employed. The predefined number of earlier transmission trials may be 1, i.e. the method is applied in case of a first unsuccessful trial of transmitting the packet data. The predefined number may alternatively larger than 1, e.g. 3, i.e. the method is applied in case third trials of transmitting the packet data were unsuccessful. One variant of the invention comprises the further step of allocating, as the transmission power for the uplink data channel for the first transmission, one of the following:
  if the available transmission power exceeds the desired transmission power for the uplink control channel, the difference between the available transmission power and the desired transmission power for the uplink control channel; or
  if the desired transmission power for the uplink control channel exceeds the available transmission power, zero transmission power.

Thus, in the first case, packet data may be transmitted on the uplink data channel with reduced transmission power compared to the desired transmission power of the uplink data channel, whereas in the second case no signal is transmitted at all on the uplink data channel.

In another variant of the invention the method comprises the step of allocating, as the transmission power for the uplink data channel for the at least one subsequent transmission triggered by the feedback indication, the smaller of the available transmission power and a desired transmission power for the uplink data channel.

The control information transmitted in the first transmission may comprise at least one of an indication of a transport format, an indication of a retransmission number, and an indication that no control information will be transmitted in the at least one subsequent transmission. The latter indication may for example comprise an extra bit or extra bits, or may be defined by a dedicated reserved value of the retransmission number.

In one implementation of the invention, the timing of uplink transmissions is known to the transmitter and the receiver, as is the case for synchronous data transmission schemes such as synchronous HARQ. In synchronous HARQ, re-transmissions occur with a known time-relation to the first transmission. The UMTS Rel. 6 E-DCH utilizes synchronous HARQ. Possible feedback indications may comprise one or more of a positive acknowledgement for a successfully received transmission, a negative acknowledgement for an unsuccessfully received transmission and an indication of no detection of a transmission signal in a transmission time interval.

In one variant of this implementation, the step of allocating zero transmission power to the uplink control channel for the at least one subsequent transmission is triggered by a positive acknowledgement or a negative acknowledgement of the first uplink transmission. For example, the negative acknowledgement might have been sent from the receiver because of a missing signal in the uplink data channel, although the control information has been successfully received in the uplink control channel.

Another variant of the implementation comprises the further step of repeating the first transmission triggered by reception of a negative feedback or an indication of no detection for the first transmission. Here, the negative acknowledgement might be sent from the receiver only in case no control information has been received in the uplink control channel, irrespective if a signal has been detected in the uplink data channel or not.

According to a second aspect of the invention, another method for the uplink transmission of packet data from a transmitter to a receiver is proposed. An uplink data channel is provided for the uplink transmission of the packet data. An uplink control channel is provided to enable the uplink transmission of control information related to the data transmission on the uplink data channel. The method comprises the steps of receiving, with a first transmission, only control information (on the uplink control channel); and initiating, in response to the reception of the control information, a transmission of an acknowledgement for the reception of the control information to prompt at least one subsequent transmission of packet data associated with the control information.

The step of receiving the first transmission may comprise the steps of detecting a signal in the uplink control channel and the uplink data channel, respectively; and the steps of recovering the transmitted control information and the packet data transmitted in the respective channel from the detected signals. The first transmission therefore may comprise either a signal in the uplink data channel which is insufficient for a recovery of the represented data; or may comprise no (detectable) signal in the uplink data channel at all. The positive acknowledgement may be sent in either case.

The received control information may comprise an indication that no control information will be transmitted in the at least one subsequent transmission. In this case, the transmission of the acknowledgement may be initiated in response to detecting this indication in the received control information.

The method may comprise the further steps of receiving, in one or more subsequent transmissions, only packet data in the uplink data channel, i.e. without successful reception of control information in the uplink control channel; and initiating, in response to the reception of the packet data, a transmission of an acknowledgement for the successful reception of the packet data.

In an implementation of the first method aspect of the invention and/or the second method aspect of the invention, the respective method may be applied for a HARQ transmission scheme, in which the first transmission and the at least one subsequent transmission are associated with one HARQ process. For example, Chase combining or soft combining may be performed for the first and the at least one subsequent transmission, assuming that these transmissions belong to the same HARQ process, when the second method aspect is performed in a receiver.

One variant of the first method aspect of the invention and/or the second method aspect of the invention may comprise that the respective method is applied in a W-CDMA mobile network for an E-DCH transmission scheme, an E-DPCCH control channel of the E-DCH transmission scheme comprising the uplink control channel and an E-DPDCH data channel of the E-DCH transmission scheme comprising the uplink data channel. Thus, the method according to at least one of the first and second aspect of the invention may for example be applied in an UMTS network, if E-DCH is implemented therein.

According to a third aspect of the invention, a computer program product is proposed, which comprises program code portions for performing the steps of any one of the method aspects of the invention described herein when the computer program product is executed on one or more computing devices, for example a (mobile) terminal or a base station of a mobile network. The computer program product may be stored on a computer readable recording medium, such as a CD-ROM or DVD. Additionally or alternatively, the computer program product may be provided for download by a download server. The downloading may be achieved, for example, via the Internet.

According to a fourth aspect of the invention, a transmitter for performing an uplink transmission of packet data from the transmitter to a receiver is proposed. An uplink data channel is provided for the uplink transmission of the packet data. An uplink control channel is provided to enable the uplink transmission of control information related to the transmission on the uplink data channel. The sum of the transmission powers for the uplink transmissions on both uplink channels is limited by an available transmission power. The transmitter comprises a power determination component adapted to determine a desired transmission power for the uplink control channel; a first power allocation component adapted to allocate, for a first transmission as the transmission power for the uplink control channel, the smaller of the available transmission power and the desired transmission power for the uplink control channel; a transmission component adapted to initiate the first transmission with the allocated transmission power; a reception component adapted to receive a feedback indication related to a reception of the first transmission; and a second power allocation component adapted to allocate, for at least one subsequent transmission triggered by the feedback indication, zero transmission power to the uplink control channel.

The transmitter may comprise a third power allocation component adapted to allocate as the transmission power for the uplink data channel for the first transmission, if the available transmission power exceeds the desired transmission power for the uplink control channel, the difference between the available transmission power and the desired transmission power for the uplink control channel; or if the desired transmission power for the uplink control channel exceeds the available transmission power, zero transmission power.

Additionally or alternatively, the transmitter may comprise a fourth power allocation component adapted to allocate as the transmission power for the uplink data channel, for the at least one subsequent transmission triggered by the feedback indication, the smaller of the available transmission power and a desired transmission power for the uplink data channel.

According to a fifth aspect of the invention, a mobile terminal is proposed, which has implemented the transmitter according to before-mentioned aspect. The mobile terminal may, e.g., be an UMTS terminal device for connecting with an UMTS network which for example employs an E-DCH scheme.

According to a sixth aspect of the invention, a receiver for performing an uplink transmission of packet data from a transmitter to the receiver is proposed. An uplink data channel is provided for the uplink transmission of the packet data. An uplink control channel is provided to enable the uplink transmission of control information related to the data transmission on the uplink data channel. The receiver comprises a reception component adapted to receive, with a first transmission, only control information on the uplink control channel; and a feedback component adapted to initiate, in response to the reception of the control information, a transmission of an acknowledgement for the reception of the control information to prompt a subsequent transmission of packet data associated with the control information.

According to a seventh aspect of the invention, a base station of a mobile network is proposed, which has implemented a receiver according to the before-mentioned aspect.

The base station may, e.g., be a Node B in an UMTS network, in which, for example, an E-DCH scheme is employed.

An eighth aspect of the invention relates to a mobile network comprising the base station according to the seventh aspect. The mobile network may be adapted to prepare configuration information related to the method according to the first aspect of the invention and to send the configuration information to the mobile terminal according to the fifth aspect of the invention via the base station. For example, the mobile network may be an UMTS network comprising an RNC, which provides configuration information such as, e.g., an indication of a maximum allowed number of subsequent transmissions, an indication of a subset from a set of allowed transport formats for the packet data, the subset specifying the transport formats for which data transmission schemes according to the first aspect of the invention may be applied. The configuration information may be provided to the mobile terminal using RRC mechanisms of the UMTS network.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as specific network systems including particular network nodes, communication standards etc., in order to provide a thorough understanding of the current invention. It will be apparent to one skilled in the art that the current invention may be practiced in other embodiments that depart from these specific details. For example, the skilled artisan will appreciate that the current invention may be practised with communication networks different from the UMTS network discussed below to illustrate the present invention. This may include other mobile networks, such as GSM networks, or wireless networks with smaller coverage, e.g. WLAN or Bluetooth systems, wherein data transmissions via an air interface may be prone to transmission errors due to limitations in transmission resources. The invention may further be practiced in wireline communication systems, for example in IP-networks. The invention may thus be practiced within any communication system in which ARQ schemes, in particular Hybrid ARQ schemes, or similar error control schemes with parallel data and control channel are performed. The invention may be applied likewise to synchronous or asynchronous data transmission schemes.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1A:
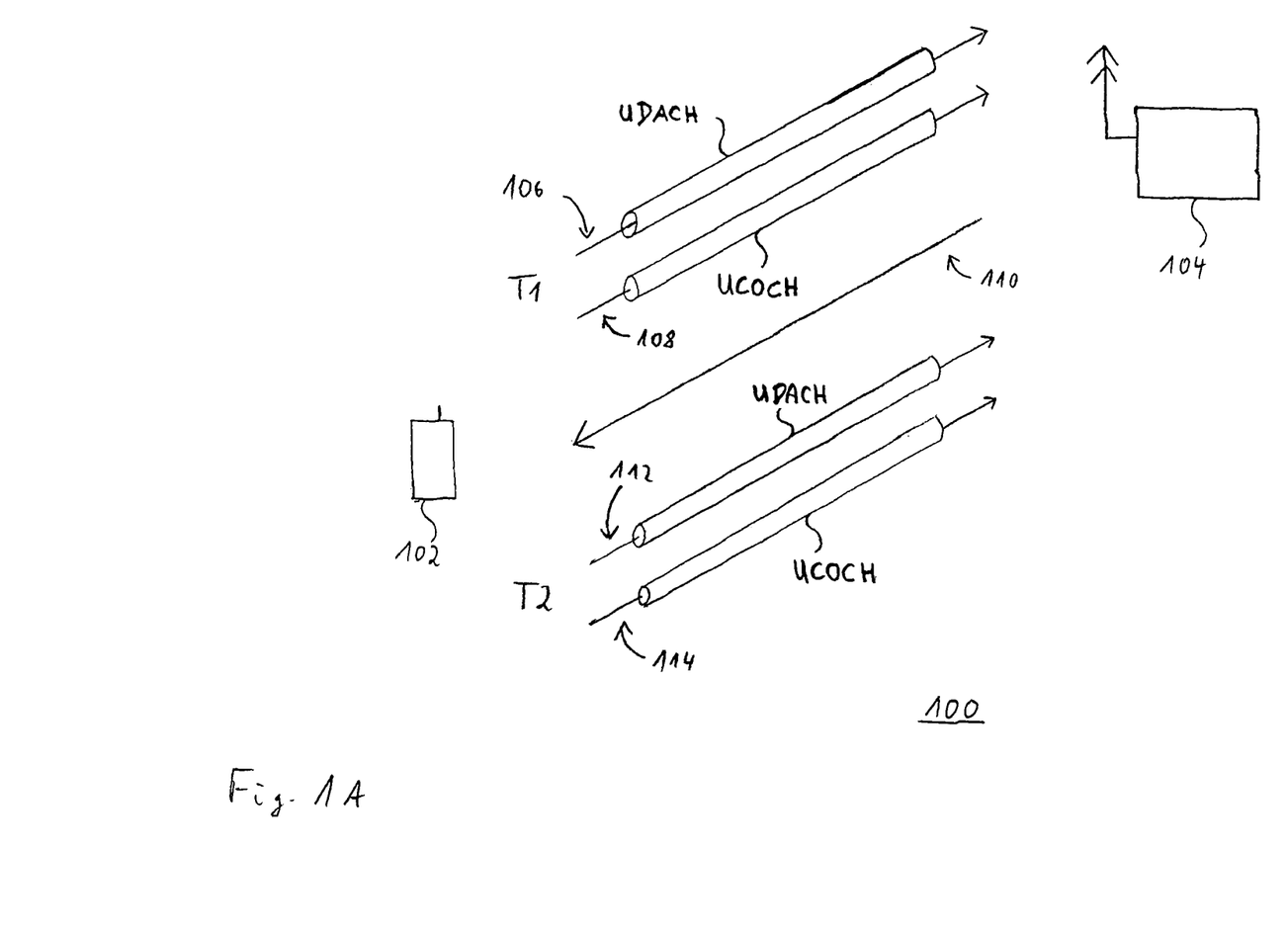
FIG. 1A is a schematic illustration of a first embodiment of a data transmission scheme between a transmitter and a receiver.

FIG. 1A schematically illustrates an embodiment of a wireless network environment 100, in which packet data are transmitted uplink from a transmitter 102 to a receiver 104. An exemplary implementation of the environment 100 might be an UMTS network, wherein the receiver 104 is a Node B of the network and the transmitter 102 is a mobile terminal (UE) connected to the UMTS network. In an UMTS framework, the transmitted packet data are termed 'data blocks'.

For data transmission from transmitter 102 to receiver 104, a Stop-and-Wait ARQ scheme is employed in embodiment 100, wherein after each transmission of a data block the transmitter waits for a feedback, e.g. a positive or a negative acknowledgement (these will occasionally be termed ACK and NACK, respectively, for short). Assuming that the ARQ scheme is a synchronous scheme, the transmission timing for the data transmissions is predefined and known to both the transmitter and the receiver. In case the receiver has not successfully detected any transmission signal in a recent transmission time interval, the receiver may "acknowledge" the non-detection with an indication of no detection; in the E-DCH framework such an indication is called "Discontinuous Transmission" (DTX).

As depicted in FIG. 1A, a first uplink transmission T1 comprises a data transmission 106 and a parallel transmission 108 of control information. The transmission T1 is acknowledged by the transmitter 104 with a feedback 110. Only after the reception of an ACK, NACK or DTX 110, the transmitter 102 will start with a subsequent uplink transmission T2 again comprising a data transmission 112 and a parallel control information transmission 114. A predefined uplink data channel UDACH is used in the transmissions T1 and T2 for the data transmissions 106 and 112. A separate uplink control channel UCOCH is used for the parallel transmissions 108 and 114 of corresponding control information. Assuming that the environment 100 comprises an UMTS network employing an E-DCH transmission scheme, the uplink data channel UDACH corresponds to the E-DPDCH of the E-DCH scheme and the uplink control channel UCOCH corresponds to the E-DPCCH of the E-DCH scheme.

The transmissions T1 and T2 are arbitrarily referenced as "first" and "subsequent" transmissions. For example, the data transmission 106 may be the first transmission of a particular data block and the subsequent transmission 112 may be the first transmission of another data block in case the reception of the first transmission T1 is positively acknowledged with an ACK by the receiver 104 in the feedback transmission 110. Alternatively, the subsequent data transmission 112 may be a re-transmission of the data block transmitted already in the first transmission 106; the re-transmission T2 in this case may be triggered by the feedback 110 being a NACK or DTX. As still another alternative, the first data transmission 106 may be a re-transmission of a data block which has already (unsuccessfully) been transmitted in at least one earlier transmission.

The control information transmitted in the transmissions 108, 114 may for example comprise an indication of the transport format used in the parallel data transmission and/or a retransmission number, which indicates that the transmitted data block is transmitted for the first, second, third, etc. time.

Figure 2A:
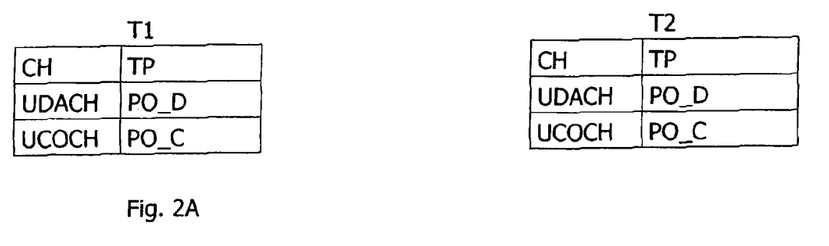
FIG. 2A is a table illustrating the allocation of transmission powers for the uplink channels of the embodiment of FIG. 1A.

FIG. 2A is a table illustrating the transmission power TP for each channel (CH) of the uplink data channel (UDACH) and the uplink control channel (UCOCH) in FIG. 1A. The transmission power TP is given as a power offset (PO) relative to a pilot channel (not indicated in FIG. 1A) power-controlled by the receiver 104. For the data channel UDACH, a power offset PO_D may be allocated in the first and subsequent transmission T1 and T2, whereas for the uplink control channel UCOCH a power offset PO_C may be allocated for the transmissions 112 and 114 of control information. The power offsets PO_D and PO_C may, for example, be calculated according to the 3GPP TS 25.214, section 5. In general, PO_D will be larger than PO_C, with PO_D depending on the chosen transport format, which in turn depends on the data block size.

Figure 1B:
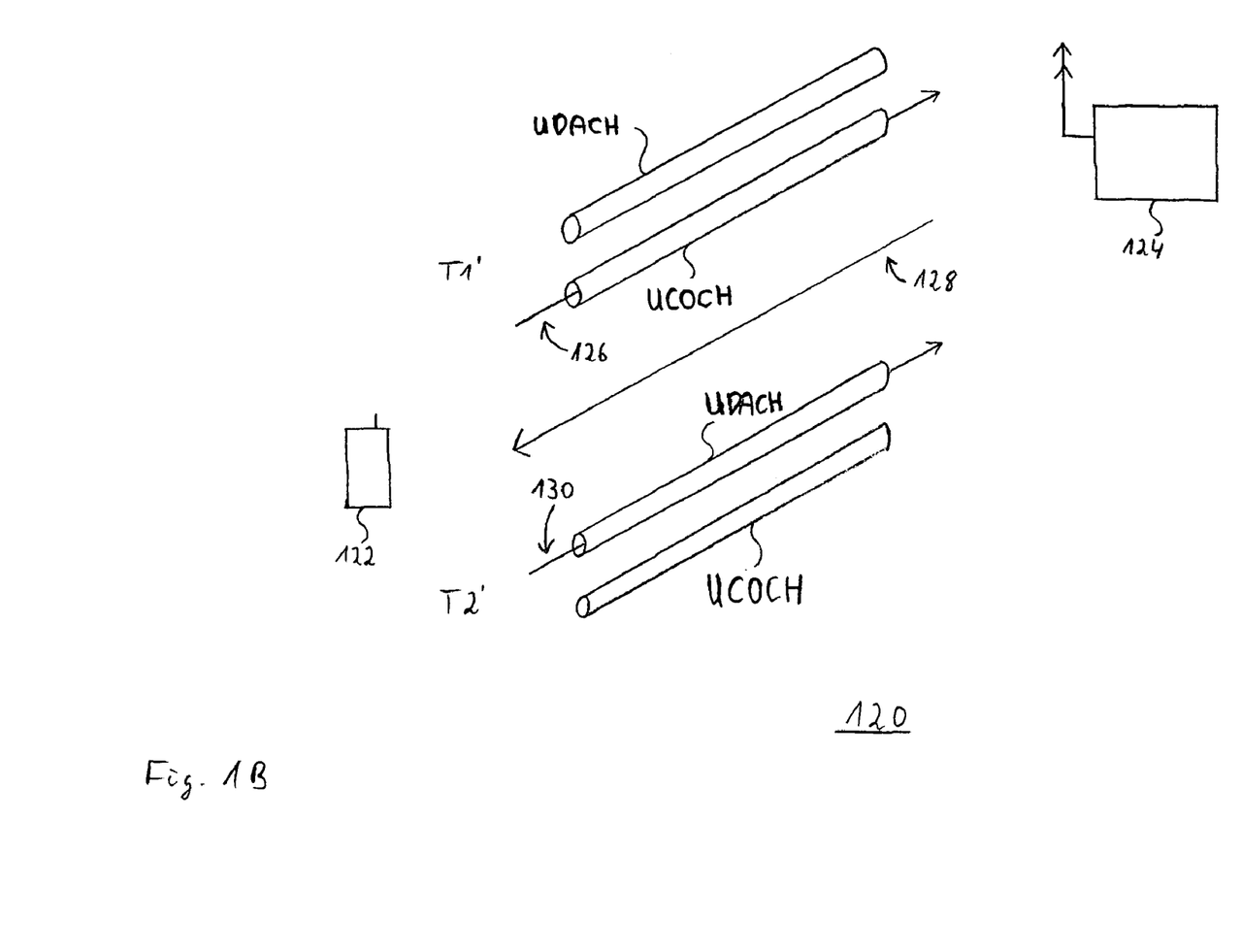
FIG. 1B is a schematic illustration of a second embodiment of a data transmission scheme between transmitter and receiver.

FIG. 1B illustrates another embodiment of a wireless network environment 120 including a transmitter 122 and a receiver 124. The network environment 120 may be the same as or may be similar to or different from the environment 100 of FIG. 1A; in any case, a different scheme for data transmission is applied.

Figure 2B:
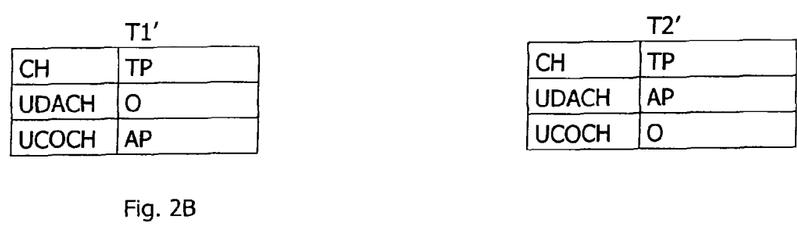
FIG. 2B is a table illustrating the allocation of transmission powers for the uplink channels of the embodiment of FIG. 1B.

In FIG. 1B, in the first transmission T1' no packet data are transmitted in the uplink data channel UDACH. Only control information is sent via transmission 126 in the control channel UCOCH to the receiver 124. As illustrated in FIG. 2B, to be understood in the same way as FIG. 2A, zero transmission power TP has been allocated to the data channel UDACH. The transmission power TP allocated to the control channel UCOCH for the transmission 126 may be the desired transmission power PO_C. For the embodiment 120 it is assumed that the available transmission power AP for the receiver 122 is smaller than PO_C and that therefore the entire available transmission power AP is allocated to the UCOCH for transmission T1', as illustrated in FIG. 2B. AP may be the available transmission power for the sum of both channels UCOCH and UDACH, which may be equal to the total transmission power available for the terminal 122 in case no other data have to be sent. In general, the transmission power TP may be chosen larger as PO_C and may be chosen to equal AP also in cases where PO_C is smaller than AP.

The receiver 124 acknowledges reception of the control information in transmission T1', although no data have been transmitted in the UDACH, with an ACK (or another indication) in the feedback transmission 128. The transmitter 122 performs—in response to the reception of acknowledgment 128—as a subsequent transmission T2' a data transmission 130 of a data block (that corresponds to the control information sent in transmission T1') in data channel UDACH. The transport format used for transmitting the data block has been indicated to the receiver 124 in the control information 126 in transmission T1'. As illustrated in FIG. 2B, in transmission T2' the transmission power TP for the control channel UCOCH is set to zero, such that no further control information is transmitted. Therefore, all available transmission power AP may be utilized for the data transmission 130, assuming that the available transmission power AP is below the desired transmission power for the uplink data channel UDACH. In this way, a reliable reception of the transmitted data block may be assured at the receiver 124.

Figure 2C:
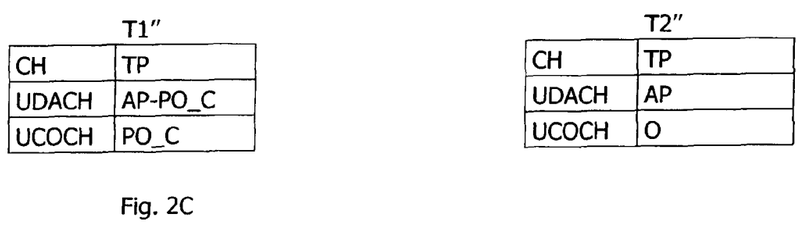
FIG. 2C is a table illustrating the allocation of transmission powers for the uplink channels of a third embodiment of a data transmission scheme between transmitter and receiver.

FIG. 2C illustrates another embodiment of a scheme for data transmission, which differs from the embodiment shown in FIG. 2B in the assumption that the available transmission power AP for the transmitter exceeds the desired transmission power PO_C for the control channel UCOCH in the first transmission T1" (in case the available transmission power AP also exceeds PO_C+PO_D, the transmission scheme of FIG. 2A may be employed). Therefore, the transmission power TP for the UCOCH is set to PO_C, and a non-zero transmission power AP−PO_C is allocated for the UDACH, i.e. the remaining transmission power. This opens the possibility that the data block can be transmitted successfully in a single transmission (T1"). The receiver would have to acknowledge the successful reception of the data block in an appropriate way to the transmitter. The transmitter may then omit the subsequent transmission (T2") and start with the transmission of a next data block, for example may perform another "first" transmission according to the scheme depicted in FIG. 2C.

Both embodiments of FIGS. 2B and 2C have in common that the uplink channels UCOCH and UDACH are ranked, for example in case the transmitter is in a power-limited regime. In the first transmission T1', T1" the UCOCH has priority when allocating (available) transmission power, whereas in the second transmission T2', T2" the UDACH is prioritized when allocating transmission power. As transmission power is allocated with priority to the UCOCH in the first transmission T1", the TP for the UDACH will (primarily) be downscaled in the power-limited case.

In the second transmission T2", the transmission power TP for the UDACH may be chosen as PO_D in case the available transmission power AP exceeds PO_D or may be chosen as AP in case PO_D exceeds AP (the latter case is shown in FIG. 2C). Therefore, in the second transmission T2" the available transmission power AP is allocated with priority to the data channel UDACH, as in FIG. 2B. In principle, it is also possible to allocate a non-zero transmission power to the UCOCH for the subsequent transmission in case AP exceeds PO_D.

In the embodiments shown in FIGS. 2A-2C, it has been assumed for simplicity that AP is constant for both the first and the subsequent transmission; however, this need not necessarily by the case. AP may be adapted to the actual transmission conditions at the beginning of each transmission time interval. As an example, in receiver devices in which all three transmission schemes depicted in FIGS. 2A-2C are implemented, a decision logic may be implemented to decide which data transmission scheme to apply to the next transmissions in cases of changing AP.

Figure 3:
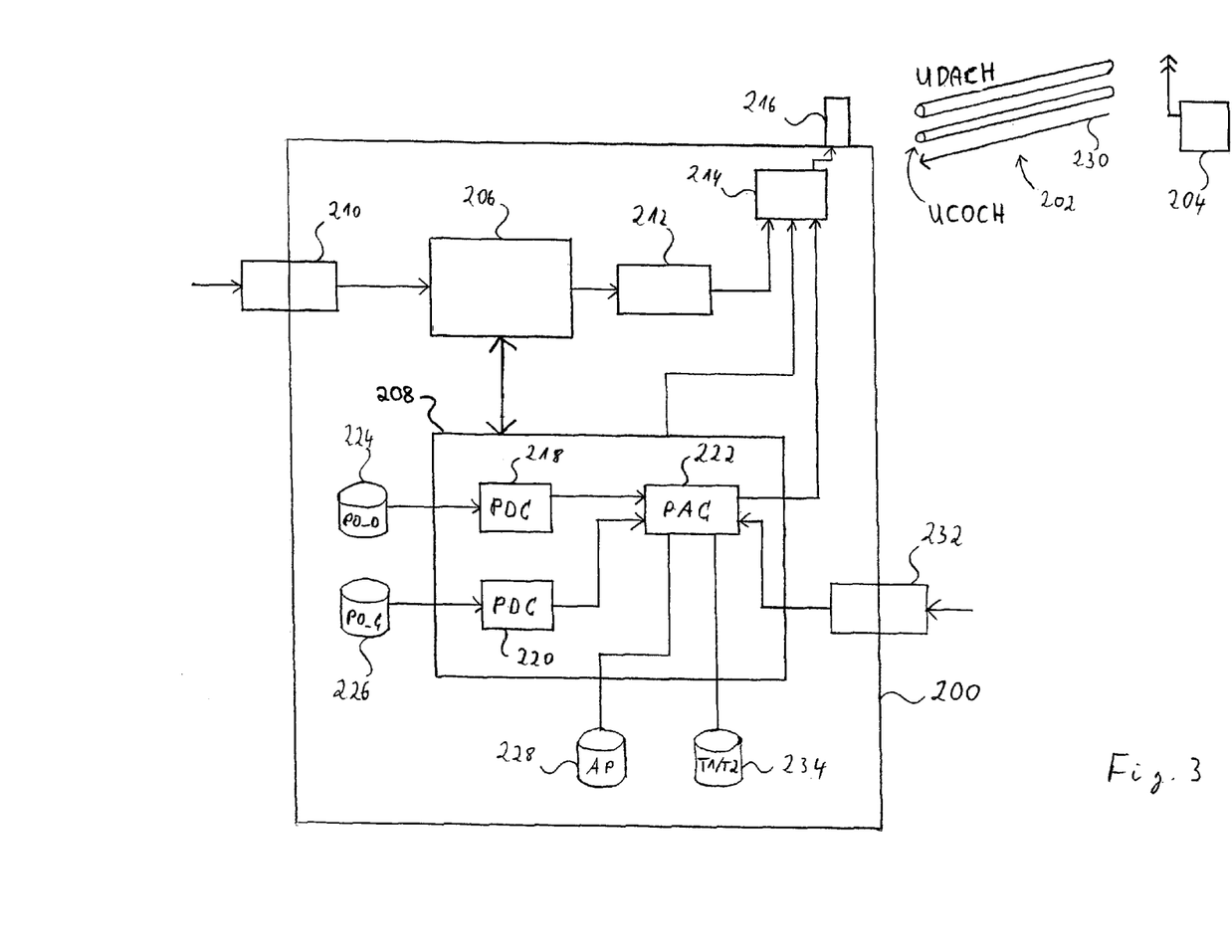
FIG. 3 is a block diagram illustrating functional components of an embodiment of a transmitter.

FIG. 3 illustrates an embodiment 200 of a transmitter adapted for implementing a scheme for a data transmission 202 schematically depicted by uplink channels UDACH and UCOCH in communication with a receiver 204. The transmission scheme 202 may include one or more of the data transmission schemes discussed with reference to FIGS. 2A-2C. The transmitter 200 may be implemented, for example, in a mobile terminal (not illustrated in FIG. 3).

The transmitter 200 comprises a data formatting component 206 and a transmission control component 208. Data to be transmitted to the receiver 204 is provided to the transmitter 200 at an input queue 210. The data may be (digitized) packet data of any kind. For example, the data may be streaming data, e.g. representing speech data or video data, or may be data for services such as SMS or MMS comprising text and/or image data.

From the input queue 210 the data are forwarded to the data formatting component 206, where the data are formatted according to a given transport format into packet data in the form of data blocks of a given transport block size. The formatted packet data is then put into an output queue 212 and is thus provided for transmission. In addition, the data formatting component 206 provides an indication of the transport format utilized for formatting the data to the transmission control component 208.

The packet data available in the output queue 212 is extracted by a transmission component 214 which eventually generates a transmission signal from the data and information provided to it for transmission over antenna 216. The transmission component 214 is controlled by the transmission control component 208. As possibly a transmitted data block will have to be re-transmitted one or more times, the transmission component may either buffer a data block extracted from the queue 212 until it receives an information from the control component 208 that the buffered data block has been successfully received and can thus be deleted, or it uses the output queue itself in an appropriate way to buffer the data block currently to be transmitted.

The transmission control component 208 provides, besides the control signal for triggering a (re-)transmission of a data block in the queue 212, control information to the transmission component 214. The control information comprises a bit sequence indicating the transport format utilized for the current data block, a retransmission number, a happy bit and an in indication if the current transmission comprises also a signal in the uplink data channel. This latter indication may also be given as a special retransmission number, for example all bits representing the retransmission number being set. The transmission component 214 feeds the received control information into the uplink control channel UCOCH.

The transmission control component 208 comprises a first power determination component (PDC) 218, a second PDC 220 and a power allocation component 222. The first PDC 218 determines a desired transmission power for the uplink data channel UDACH for reception of the packet data at the receiver. To this end, the PDC 218 extracts predetermined parameters from a storage 224. For example, the stored parameters may comprise a power offset PO_D and gain factors for the UDACH. These may have been provided, e.g., from an RNC in a mobile network via the base station 204 using the RRC protocol according to the 3GPP TS 25.331. The second PDC 220 determines a desired transmission power for the uplink control channel UCOCH for reception of the control information at the receiver. In a similar way as has been described for the PDC 218, the PDC 220 extracts pre-determined parameters from a storage 226.

Both PDCs 218 and 220 provide the determined desired transmission powers to the power allocation component (PAC) 222. This component further extracts from a storage component 228 the current value of the available transmission power (AP). This value may be provided from another internal component of the transmitter 200 (not shown) or the base station 204. The available transmission power AP may be the power available for the transmission in both the UDACH and UCOCH, which may be the entire available transmission power for the transmitter in case no other uplink channels have to be fed.

The PAC 222 allocates, based on the desired transmission powers and the available transmission power, the actual transmission powers to the UCOCH and the UDACH. It does so by firstly calculating if the available transmission power AP exceeds the sum of the desired transmission powers PO_D and PO_C. If this is the case, the PAC 222 may allocate the desired transmission powers as the actual transmission powers, i.e. the PAC 222 applies the scheme illustrated in FIG. 2A. The other cases will be described further below. In any case, i.e. regardless of which particular allocation scheme is applied, the PAC 222 provides the values of allocated transmission power for the UDACH and the UCOCH to the transmission component 214. Provision of these values may at the same time serve to trigger the transmission component to extract the data block for the next transmission from the output queue 212 (or from a buffer in case of re-transmission).

The base station 204 may provide a feedback 230 to the transmitter 200 for each transmission time interval. A reception component 232 is provided in the transmitter 200 adapted to receive a feedback indication related to the received feedback. The reception component is in particular adapted to receive a feedback indication related to a "first" transmission in the sense discussed for the embodiments of FIGS. 2A-2C. For example, if the transmitter 200 is implemented in a mobile terminal, the reception component 232 may be an input component of the transmitter 200 adapted to receive signals from a receiver also implemented in the mobile terminal (in other embodiments, the reception component 232 comprises a receiver for receiving the feedback of the base station 204). The type of feedback, i.e. whether it represents an ACK, NACK or DTX, may be determined by the receiver or by the reception component 232 of the transmitter 200. In any case, the reception component 232 provides a signal indicative of the type of feedback to the transmission control component 208.

Referring back to the PAC 222, in case the sum of the desired transmission powers PO_D and PO_C exceeds the available transmission power AP, the PAC 222 applies the schemes illustrated in FIGS. 2B, 2C. Firstly, the PAC 222 determines if the available transmission power AP exceeds the desired transmission power PO_C for the UCOCH. If this is the case, the PAC 222 allocates the desired transmission power PO_C to the UCOCH and the remaining power AP−PO_C to the UDACH. Only in the case that PO_C exceeds the available transmission power AP, the transmission power for the UCOCH is set to the available transmission power AP and for the UDACH is set to zero (in an alternative embodiment, in any of the cases in which AP is below the sum of PO_D and PO_C, but exceeds PO_C, the PAC 222 sets the transmission power of the UDACH to zero).

In addition to providing the values of the allocated transmission powers to the transmission component 214, the PAC also sets a transmission status indicator, which is stored in a T1/T2 storage component 234. The indicator may be represented by a single bit or two bits, the latter option being described in the following. The first of the two bit sequence indicates if a two-step scheme is momentarily performed, i.e. if one of the transmission schemes of FIGS. 2B, 2C is momentarily performed. The second bit, if set, indicates the first step, i.e. transmission T1, and, if not set, indicates the second or subsequent step, i.e. transmission T2. A set bit may be '1', whereas a not-set bit may be '0'. Thus, having allocated the transmission powers for the UCOCH and the UDACH for the first transmission T1, the PAC 222 stores the bit sequence '11' in the storage component 234.

The transmission component 214 now performs the transmission T1 according to the allocated values of the transmission power for the uplink channels. A feedback 230 is received from the base station 204. The reception component 232 receives an indication of the received feedback and provides a corresponding signal to the transmission control component 208, more precisely to the PAC 222. The feedback indication may e.g. indicate a successful reception of the UCOCH in the base station 204, i.e. an 'ACK' or a 'NACK' depending on the implementation of the transmission scheme in the receiver 204. At least in case the reception of the UCOCH in the receiver is positively acknowledged with an ACK to the transmitter, although no or limited transmission power has been allocated to the uplink data channel, the transmitter may safely assume that the receiver is aware of the transmission scheme (with first and subsequent transmissions) utilized by the transmitter and may thus continue by transmitting the corresponding data on the UDACH (with limited or no transmission power on the parallel uplink control channel). In the other case, in which the receiver has acknowledged the transmission T1' of FIG. 2B with a NACK although it has received the UCOCH successfully, it may be unclear to the transmitter 200 if the control information has been successfully received. However, the transmitter may either assume a successful reception, or the NACK may contain an indication if the control information has been successfully received in the receiver, depending on the implementation.

For any allocation of transmission powers, the PAC 222 accesses the storage component 234 to determine the transmission scheme momentarily to be applied. For example, bit sequences with the first bit being not set, i.e. '00' or '01', indicate that the transmission schemes of FIG. 2A have to be applied. The first and the second bit being set is an indication that the transmission scheme T1' or T1" according to FIG. 2B or 2C has been performed in the previous transmission time interval and that the subsequent transmission T2' or T2" has to be performed in case the control information has been successfully received during T1' or T1".

Assuming that the transmitter 200 has received an ACK for a first transmission, the PAC 222 unconditionally allocates for the subsequent transmission zero transmission power for the UCOCH. For allocating transmission power to the UDACH, it accesses the storage components 224 and 228 to receive the current values for PO_D and AP. In case PO_D exceeds AP, the entire available transmission power AP is allocated to the UDACH, as illustrated in FIGS. 2B, 2C for the transmissions T2' or T2". In case AP exceeds PO_D (but not the sum PO_D+PO_C), the PAC 222 may allocate PO_D to the UDACH (a case not shown in FIGS. 2A-2C). When providing the allocated transmission powers for the subsequent transmission to the transmission component 214, the PAC 222 also sets the transmission status indicator in the storage component 234 to '11', indicating that a subsequent transmission has been performed for at least one time.

Depending on the feedback received, the subsequent transmission may be repeated until the packet data to be transmitted in the UDACH have been successfully been received. In that case, the PAC will, in response to an indication of a successful feedback indication, reset the transmission status indicator to '00' or to '10', depending on the available transmission power in relation to the sum of the desired transmission powers.

Whereas an exemplary operation of the transmitter 200 has been described, it is clear that the transmitter 200 may be adapted to implement other methods, procedures or techniques described herein. The transmitter may decide to apply a particular data transmission scheme according to a set of predefined rules in order to increase the probability for successful data transmission. For example, the transmitter may decide to apply one of the schemes illustrated in FIGS. 2B and 2C after it has received one or more times a NACK or DTX for a prior transmission of the particular data using another error control scheme. Alternatively or additionally, the transmitter may switch to the schemes of FIGS. 2B, 2C regardless of the result of prior transmissions, for example in case the transmitter gets into a power-limited regime or is about to utilize a predefined particular transport format.

In case multiple receivers are present, the situation may occur that for a transmission the uplink control channel is received in one cell and the uplink data channel is received in the other cell. To apply schemes such as that of FIG. 2C in these cases, the desired transmission power for the control channel should be chosen such that the uplink control channel may be received in any of the cells.

Figure 4:
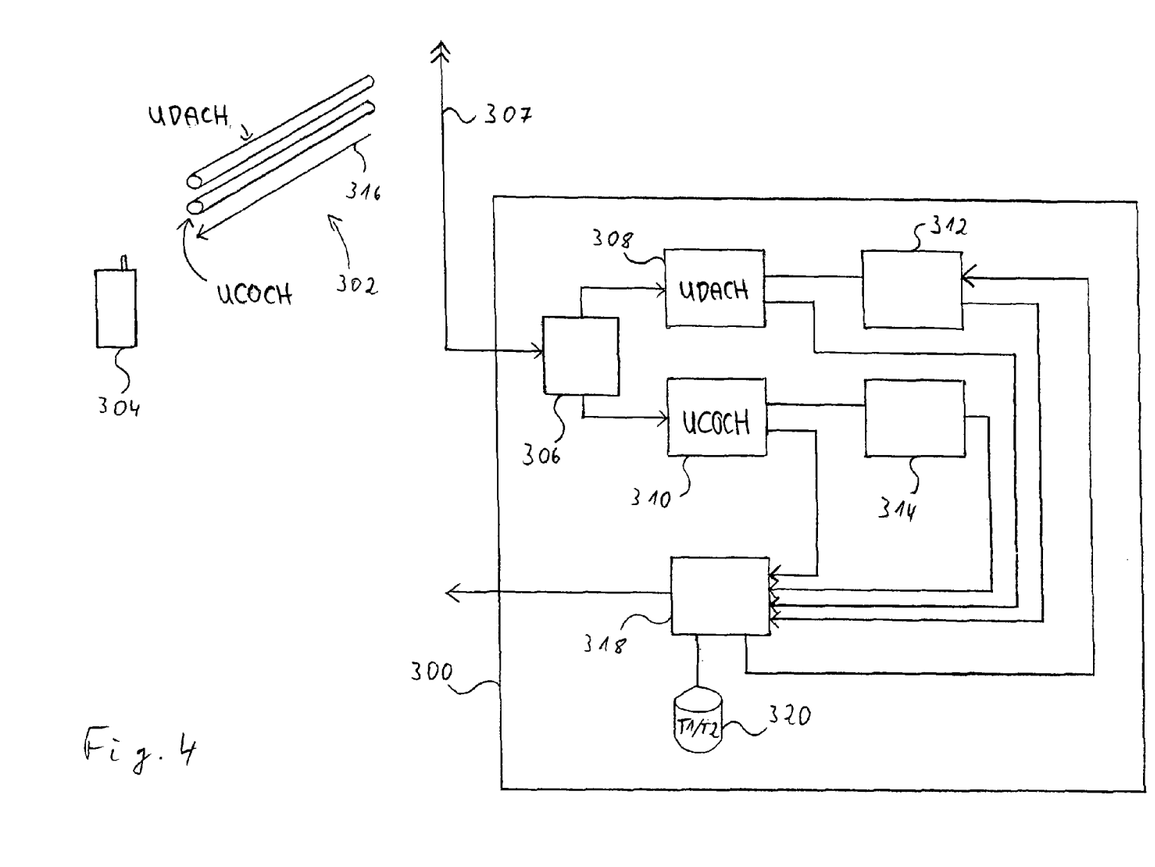
FIG. 4 is a block diagram illustrating functional components of an embodiment of a receiver.

FIG. 4 schematically illustrates the functional components of an embodiment of a receiver 300 adapted for implementing one or more of the error control schemes described herein for a data transmission 302 schematically depicted by uplink channels UDACH and UCOCH in communication with a transmitter 304. The receiver 300 may, for example, be an implementation of one of the receivers 104, 124 or 204 illustrated in the foregoing figures. In particular, the receiver 300 may be a part of a base station of a mobile network (not shown).

The receiver 300 includes a channel filter 306, which filters a signal received via antenna 307 from the transmitter 304 to provide a signal portion corresponding to the data channel UDACH to a first signal detection component 308 and a second signal portion corresponding to the control channel UCOCH to a second signal detection component 310. For example, in an UMTS E-DCH system, the channel filter 306 may provide signal portions corresponding to the E-DPDCH and E-DPCCH, respectively, to the signal detection components 308 and 310. Each of the components 380 and 310 decides if a signal of the transmitter 304 is present in the provided signal portion and, in case a signal is successfully detected, forwards the detected signal to reception components 312 and 314. In a data reception component 312, transmitted packet data, e.g. a data block, will be recovered from the detected signal. In a control information (CI) reception component 314, transmitted control information will be recovered from the detected signal.

To provide a feedback 316 to the transmitter 304, a feedback component 318 is provided in the receiver 300, which receives from each of the components 308 and 310 an indication whether a signal has been successfully detected, and which receives from each of the components 312 and 314 an indication whether data and control information, respectively, have been successfully recovered. The feedback component 318 comprises logic circuitry to determine the appropriate feedback (ACK, NACK or DTX) to be sent back to the transmitter 304. The logic suitably combines the indications from the components 308-314.

For example, in case both the UDACH and the UCOCH comprise a detectable signal representing recoverable packet data and control information, respectively, the feedback component 318 may initiate the sending of a positive acknowledgement ACK to the transmitter 304. In case there is no signal detectable in any one of the uplink channels, the sending of an indication of no detection DTX may be initiated. If one or two signals are detectable, but neither data nor control information can be recovered from the signals, a negative feedback NACK may be initiated.

In context with the data transmission schemes depicted in FIGS. 2B and 2C, a positive acknowledgement may also be initiated if the data channel does not carry any detectable signal (FIG. 2B, T1') or does at least not contain recoverable data (possibly the result of the transmission in FIG. 2C, T1"), but the control channel carries recoverable control information. In this case, the feedback component 318 may decide that a "first" transmission according to one of the schemes of FIGS. 2B and 2C has been performed, such that the successfully received control information have to be utilized for at least one subsequent transmission. The feedback component may trigger the buffering of the received control information and a detected signal in the UDACH, if any, for use in a subsequent transmission (not illustrated in FIG. 4). The feedback component may further set and store a T1/T2 indicator in a storage component 320, which indicates that presumably a "first" transmission T1' or T1" according to the schemes of FIGS. 2B, 2C has been received.

Assuming the transmitter 304 is applying one of the schemes of FIGS. 2B, 2C, in a subsequent transmission T2', T2" the control channel may be devoid of any detectable signal and the data channel carries the packet data announced in the first transmission. Whereas in a transmission scheme according to FIG. 2A such a transmission would lead to a NACK feedback, the feedback component sees from the set T1/T2 indicator buffered in the storage component 320 that a preceding transmission was a first transmission T1', T1" and that therefore the current transmission is a "subsequent" transmission T2', T2". The feedback component may thus provide a control signal to the data recovery component 312 to utilize the previously received control information and the previously received data signal for recovering the data carried in the currently received signal in the UDACH. In case a data recovery is successful, the feedback component may then reset the T1/T2 indicator and may initiate sending of an ACK to the transmitter 304.

A base station implementing the receiver 300 of FIG. 4 may also comprise functionality adapted for sending, e.g. in a dedicated physical control channel, towards the transmitter 304 configuration information regarding one or more of the data transmission schemes described herein. The configuration information may, e.g., comprise an indication of a maximum allowed number of "subsequent" transmissions T2', T2". In case a successful reception of packet data is not acknowledged to the transmitter within the allowed number of transmissions, a re-transmission of the control information (i.e. a re-transmission of a "first" transmission T1' or T1") has to be performed. The maximum allowed number of subsequent transmissions may be configurable and may in particular differ from the maximum number of re-transmissions for other error control schemes. The configuration information may further comprise an indication of a subset from a set of allowed transport formats for the packet data, the subset specifying the transport formats for which data transmission schemes such as that of FIGS. 2B, 2C may be applied.

The signalling of the configuration information may be performed via higher layers of the connection between receiver and transmitter. Such a higher layer protocol may, for example, be the RRC (Radio Resource Control) layer in UMTS networks.

Figure 5:
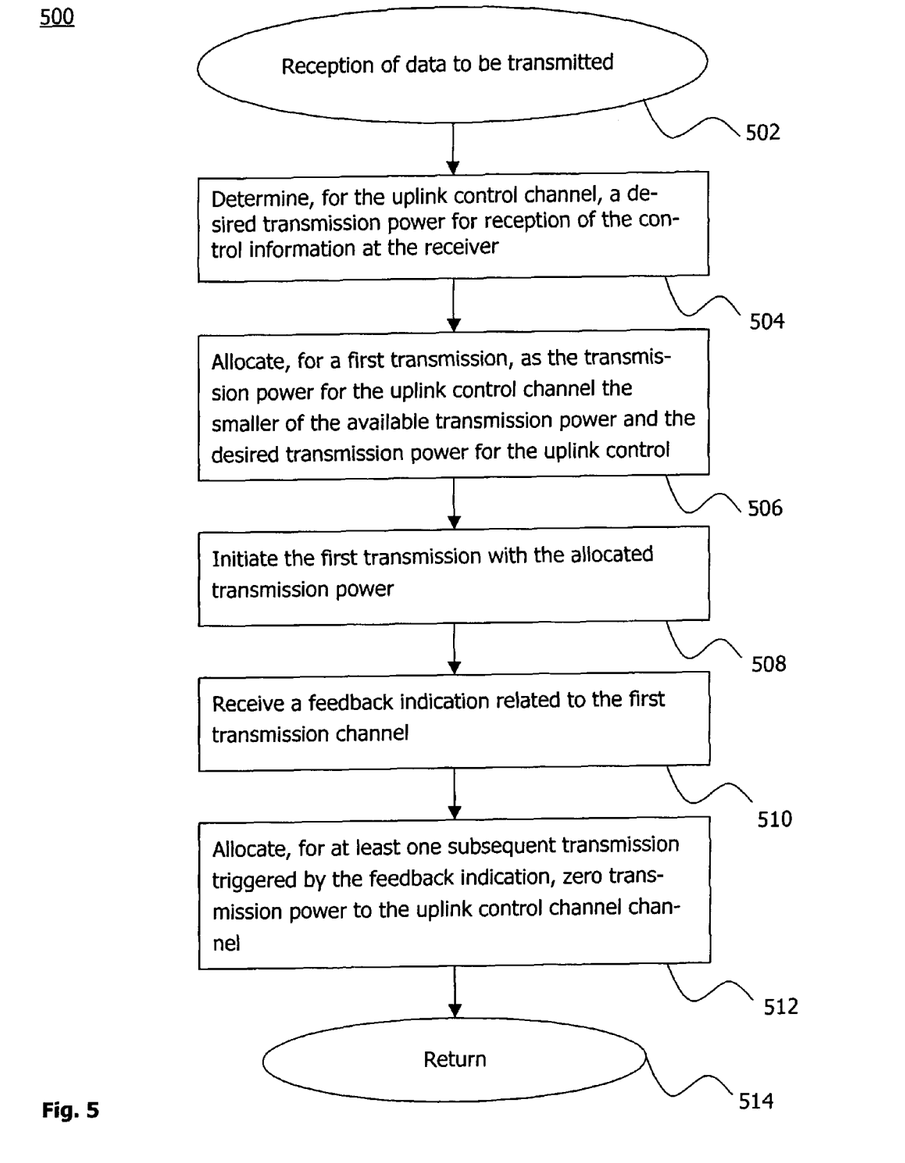
FIG. 5 is a flowchart illustrating a first embodiment of an error control method for data transmissions.

FIG. 5 schematically illustrates an embodiment of a method 500 for an uplink transmission of packet data from a transmitter to a receiver. The method may be implemented in any one of the receiver devices 102, 122, 200 and 304 illustrated in the foregoing figures. It is assumed that an uplink data channel (UDACH) is provided for the uplink transmission of the packet data. An uplink control channel (UCOCH) is provided to enable the uplink transmission of control information related to the transmission on the uplink data channel. The sum of the transmission powers for the uplink transmissions on both uplink channels is limited by an available transmission power (AP).

The method may be triggered by the reception of data to be transmitted in the receiver in step 502. For example, the receiver may be implemented in a mobile terminal, from which data have to be sent uplink to a mobile network. Additional steps not illustrated in FIG. 5 may be performed to determine which error control transmission scheme will selectively be applied, e.g. depending on the available transmission power and the desired transmission powers for the uplink channels.

In step 504, a desired transmission power for reception of the control information at the receiver is determined for the uplink control channel. A similar determination may be performed for the uplink data channel. In step 506, for a first transmission the smaller of the available transmission power and the desired transmission power for the uplink control channel is allocated as the transmission power for the uplink control channel. The uplink data channel may have allocated, e.g., zero transmission power to it. In step 508, the first transmission with the allocated transmission power is initiated.

In step 510, a feedback indication related to the first transmission is received. In steps 512, zero transmission power is allocated, triggered by the feedback indication, to the uplink control channel for at least one subsequent transmission. For example, an ACK (in other implementations, a NACK) may have been received as a feedback, which indicates that the control information has been successfully received at the receiver in the first transmission. After execution, the error control routine may return control to a higher layer control program in step 514.

Figure 6:
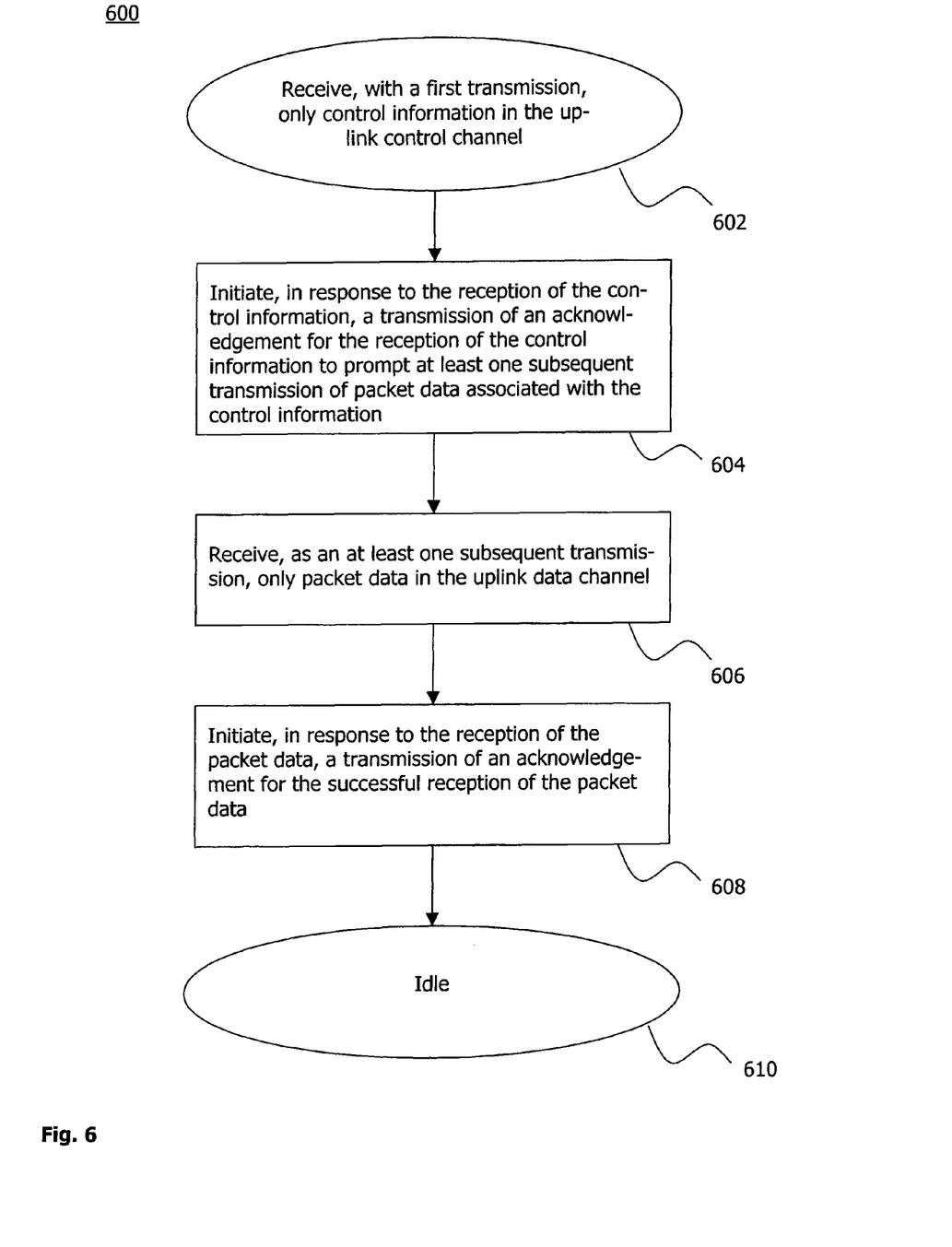
FIG. 6 is a flowchart illustrating a second embodiment of an error control method for data transmissions.

FIG. 6 schematically illustrates an embodiment of a method 600 for an uplink transmission of packet data from a transmitter to a receiver. The method may be implemented in any of the transmitter devices 104, 124, 204 and 300 illustrated in the foregoing figures. It is assumed that an uplink data channel (UDACH) is provided for the uplink transmission of the packet data. An uplink control channel (UCOCH) is provided to enable the uplink transmission of control information related to the data transmission in the uplink data channel. For each uplink transmission, a feedback is sent from the receiver to the transmitter.

The method starts in step 602 with the reception, with a first transmission, of control information only in the uplink control channel, i.e. no data is received in the uplink data channel because either no signal has been successfully detected in the UDACH or no data have been successfully recovered from a received signal. In step 604, in response to the reception of the control information, a transmission of an acknowledgement (e.g., an ACK) for the reception of the control information is initiated to prompt at least one subsequent transmission of packet data associated with the control information.

In step 606, in one of the at least one subsequent transmissions, only packet data may be received in the uplink data channel, i.e. no control information is received in the UCOCH. In step 608, in response to the reception of the packet data, a transmission of an acknowledgement for the successful reception of the packet data is initiated. The routine proceeds to step 610 to wait for further transmissions.

The data transmission schemes of the FIGS. 2B and 2C provide a more reliable data transmission as the available transmission power of the transmitter is utilized to achieve firstly a transmission of the control information and secondly a transmission of the data. The schemes may therefore be utilized in case where a transmitter operates in a power-limited regime. However, the schemes may also be used in cases where only few data have to be transmitted, i.e. an amount of data to be transmitted is of the order of the size of the control information. For example, the transmission of speech data typically requires the continuous transmission of small amounts of data. In such a case, in a first transmission control information may be transmitted, which relate to the speech data transmitted in subsequent transmissions, wherein the transmission of the control information is omitted.

In general, a "subsequent" transmission of control information may be omitted in case such a transmission would carry redundant information. For example, in case a first transmission has been received comprising control information, the transport format for the data transmitted in subsequent transmissions may already be known. Additionally or alternatively, a re-transmission number may be known from the first transmission and may simply be counted-up in the receiver without any need to transmit the re-transmission number again. This holds also in case the first transmission is not the first transmission of particular data, but is already a re-transmission of the data.

The data transmission schemes proposed herein allow a reliable and efficient transmission of data, for example in cases when a transmitter operates in a power-limited regime. Resource usage is more efficient in comparison to transmission schemes which require the mandatory transmission of data in the uplink data channel and control information in the parallel control channel. At the same time, the data transmission schemes proposed here are more reliable than blind-detection schemes without any transmission of control information. Further, the proposed schemes allow for an improved capacity and coverage because the available transmission power in a transmitter is utilized in a particularly efficient way. Only very few processing resources are required in the transmitter and in the receiver, in contrast to blind detection schemes which require a considerable overhead in the receiver.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for an uplink transmission of packet data from a transmitter to a receiver, wherein an uplink data channel is provided for the uplink transmission of the packet data, an uplink control channel is provided to enable the uplink transmission of control information related to the transmission on the uplink data channel, and the sum of the transmission powers for the uplink transmissions on both uplink channels is limited by an available transmission power for each transmission, said method comprising the steps of:
   determining, for the uplink control channel, a desired transmission power;
   allocating the available transmission power for a first transmission with priority to the uplink control channel, wherein the allocation comprises allocating as the transmission power for the uplink control channel the smaller of the available transmission power and the desired transmission power for the uplink control channel;
   initiating the first transmission with the allocated transmission power;
   receiving a feedback indication related to a reception of the first transmission; and
   allocating the available transmission power for at least one subsequent transmission triggered by the feedback indication with priority to the uplink data channel, wherein the allocation comprises allocating zero transmission power to the uplink control channel.

2. The method of claim 1, wherein the method is selectively applied when the available transmission power is smaller than a sum of desired transmission powers for the uplink data channel and the uplink control channel.

3. The method of claim 1, wherein the method is selectively applied when an amount of packet data to be transmitted is smaller than a predefined threshold.

4. The method of claim 1, wherein the method is selectively applied for a predefined set of one or more transport formats for the uplink transmission of the packet data.

5. The method of claim 1, wherein the method is selectively applied for a re-transmission of the packet data.

6. The method of claim 1, further comprising the step of allocating, as the transmission power for the uplink data channel for the first transmission, one of the following:
   if the available transmission power exceeds the desired transmission power for the uplink control channel, the difference between the available transmission power and the desired transmission power for the uplink control channel; or
   if the desired transmission power for the uplink control channel exceeds the available transmission power, zero transmission power.

7. The method of claim 1, further comprising the step of allocating, as the transmission power for the uplink data channel for the at least one subsequent transmission triggered by the feedback indication, the smaller of the available transmission power and a desired transmission power for the uplink data channel.

8. The method of claim 1, wherein the control information transmitted in the first transmission comprises at least one of an indication of a transport format, an indication of a retransmission number, and an indication that no control information will be transmitted in the at least one subsequent transmission.

9. The method of claim 1, wherein the timing of uplink transmissions is known to the transmitter and the receiver, and wherein possible feedback indications comprise one or more of a positive acknowledgement for a successfully received transmission, a negative acknowledgement for an unsuccessfully received transmission and an indication of no detection of a transmission signal in a transmission time interval.

10. The method of claim 9, wherein the step of allocating zero transmission power to the uplink control channel for the at least one subsequent transmission is triggered by a positive acknowledgement or a negative acknowledgement of the first uplink transmission.

11. The method of claim 9, further comprising the step of repeating the first transmission triggered upon reception of a negative feedback or an indication of no detection for the first transmission.

12. A method for the uplink transmission of packet data from a transmitter to a receiver, wherein an uplink data channel is provided for the uplink transmission of the packet data, and an uplink control channel is provided to enable the uplink transmission of control information related to the data transmission on the uplink data channel, said method comprising the steps of:
   receiving, with a first transmission, only control information on the uplink control channel; and
   initiating, in response to the reception of the control information, a transmission of an acknowledgement for the reception of the control information to prompt at least one subsequent transmission of packet data associated with the control information;
   wherein the received control information comprises an indication that no control information will be transmitted in the at least one subsequent transmission, and the transmission of the acknowledgement is initiated in response to detecting this indication in the received control information.

13. The method of claim 12, further comprising the steps of:
- receiving, in one or more subsequent transmissions, only packet data in the uplink data channel; and
- initiating, in response to the reception of the packet data, a transmission of an acknowledgement for the successful reception of the packet data.

14. The method of claim 12, wherein the method is applied for a HARQ transmission scheme, in which the first transmission and the at least one subsequent transmission are associated with one HARQ process.

15. The method of claim 12, wherein the method is applied in a W-CDMA mobile network for an E-DCH transmission scheme, an E-DPCCH control channel of the E-DCH transmission scheme comprising the uplink control channel and an E-DPDCH data channel of the E-DCH transmission scheme comprising the uplink data channel.

16. A transmitter for performing an uplink transmission of packet data from the transmitter to a receiver, wherein an uplink data channel is provided for the uplink transmission of the packet data, an uplink control channel is provided to enable the uplink transmission of control information related to the transmission on the uplink data channel, and the sum of the transmission powers for the uplink transmissions on both uplink channels is limited by an available transmission power for each transmission, said transmitter comprising:
- a power determination component configured to determine a desired transmission power for the uplink control channel;
- a first power allocation component configured to allocate the available transmission power for a first transmission with priority to the uplink control channel, wherein the allocation comprises to allocate as the transmission power for-the uplink control channel the smaller of the available transmission power and the desired transmission power for the uplink control channel;
- a transmission component configured to initiate the first transmission with the allocated transmission power;
- a reception component configured to receive a feedback indication related to a reception of the first transmission; and
- a second power allocation component configured to allocate the available transmission power for at least one subsequent transmission triggered by the feedback indication with priority to the uplink data channel, wherein the allocation comprises to allocate zero transmission power to the uplink control channel.

17. The transmitter of claim 16, further comprising a third power allocation component configured to allocate as the transmission power for the uplink data channel for the first transmission one of the following:
- if the available transmission power exceeds the desired transmission power for the uplink control channel, the difference between the available transmission power and the desired transmission power for the uplink control channel; or
- if the desired transmission power for the uplink control channel exceeds the available transmission power, zero transmission power.

18. The transmitter of claim 16, further comprising a fourth power allocation component configured to allocate, as the transmission power for the uplink data channel for the at least one subsequent transmission triggered by the feedback indication, the smaller of the available transmission power and a desired transmission power for the uplink data channel.

19. The transmitter of claim 16, wherein the transmitter comprises a mobile terminal transmitter included in a mobile terminal.

20. A receiver for receiving an uplink transmission of packet data from a transmitter to the receiver, wherein an uplink data channel is provided for the uplink transmission of the packet data, and an uplink control channel is provided to enable the uplink transmission of control information related to the data transmission on the uplink data channel, said receiver comprising:
- a reception component configured to receive, with a first transmission, only control information on the uplink control channel; and
- a feedback component configured to initiate, in response to the reception of the control information, a transmission of an acknowledgement for the reception of the control information to prompt at least one subsequent transmission of packet data associated with the control information;
- wherein the received control information comprises an indication that no control information will be transmitted in the at least one subsequent transmission;
- wherein the feedback component is further configured to initiate the transmission of the acknowledgement in response to detecting the indication in the received control information.

21. The receiver of claim 20, wherein the receiver comprises a base station receiver included in a base station of a mobile network.

* * * * *